(No Model.)
C. E. BUELL.
MEANS FOR CHARGING SECONDARY BATTERIES.
No. 255,248. Patented Mar. 21, 1882.
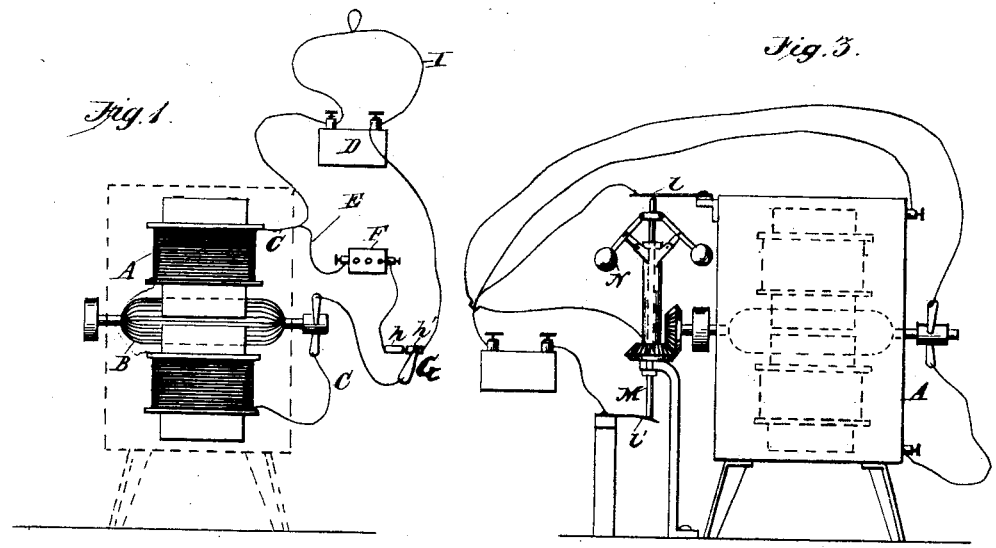
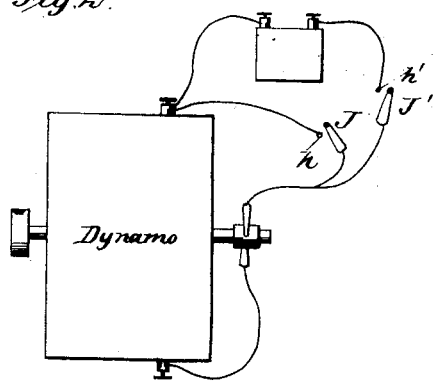
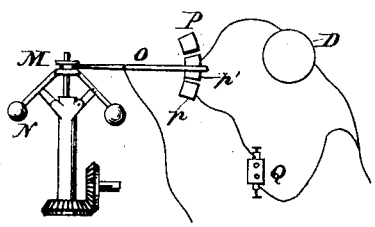
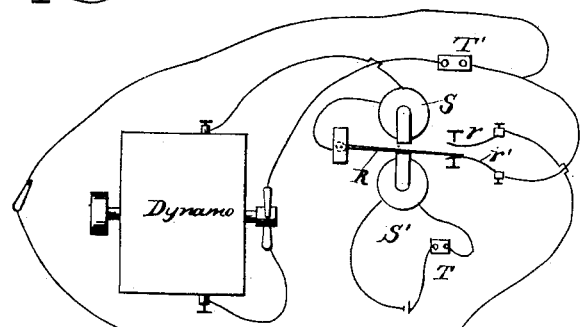
Attest,
W. H. Knight
F. H. Knight
Inventor,
Charles E. Buell,
by Melville Church,
his atty.

UNITED STATES PATENT OFFICE.

CHARLES E. BUELL, OF NEW HAVEN, CONNECTICUT.

MEANS FOR CHARGING SECONDARY BATTERIES.

SPECIFICATION forming part of Letters Patent No. 255,248, dated March 21, 1882.

Application filed January 13, 1882. (No model.)

*To all whom it may concern:*

Be it known that I, CHARLES E. BUELL, of New Haven, in the county of New Haven and State of Connecticut, have invented a certain Improved Means for Charging Secondary Batteries; and I do hereby declare the following to be a full, clear, and exact description of the same, reference being had to the accompanying drawings, and to the letters of reference marked thereon.

Heretofore where secondary electric batteries have been charged by dynamo-electric machines it has been the practice to first speed up the machine on an open circuit and then close the circuit through the secondary batteries. Before the circuit is closed the armature of the machine merely gains momentum, and but little electrical power is developed; but upon the closing of the circuit the machine develops power very rapidly. After a secondary battery has been once used it remains thereafter partially charged, and therefore, when after first use the circuit of a dynamo-electric machine is closed through it, it instantaneously reacts before the machine develops sufficient power to overcome it, and thus operates to change the polarity of the magnets of the machine and renders the charging operation a failure.

My invention has for its object to obviate the above defective mode of charging; and to this end it consists in the combination of a dynamo-electric machine, a developing-circuit, on which the machine is worked temporarily, a main charging-circuit including one or more secondary batteries, and means for dividing the current through the developing-circuit and the main charging-circuit, and then breaking the developing-circuit without breaking the main charging-circuit.

It further consists in the several novel combinations and sub-combinations of devices hereinafter fully described and claimed for practically carrying out my invention.

In the accompanying drawings, Figure 1 represents a form of apparatus for carrying out my invention in which hand-switches are employed to put the secondary battery in and out of the charging circuit. Fig. 2 is a modification of the same. Fig. 3 represents a form of apparatus in which an automatic switching arrangement is employed. Fig. 4 represents a modified form of automatic switch. Fig. 5 represents an arrangement in which a switch-armature is shifted to put the secondary battery into circuit.

Similar letters of reference in the several figures denote the same parts.

Referring to Fig. 1, A represents the helices of the field-of-force magnets of a dynamo-electric machine; B, the revolving armature of the machine; C, the charging-circuit; D, a secondary battery adapted to be interposed in the charging-circuit; E, a shunt or auxiliary circuit including a variable resistance; F and G, a hand-switch adapted to make connection with one or the other of contacts $h$ $h'$, as shown.

I represents a working-circuit including the secondary battery, and adapted for use as a circuit for telephonic, electric-light, or other purposes.

When the machine is at rest the switch G is turned to the contact $h$, and a circuit is thus completed through the shunt or auxiliary circuit and resistance F and the helices of the field-of-force magnets of the machine. The machine being then started up, electrical power is rapidly developed, and when a sufficient speed has been attained the switch is turned to connect with the contact $h'$. If the path through the secondary battery then offers less resistance to the passage of the current than the resistance F, the secondary battery will become properly and instantly charged. After charging the switch is again turned back to the contact $h$, except where several series of secondary batteries are arranged to be successively interposed in the charging-circuit, as shown in former applications for patents filed by me, in which case the switch is left in connection with the contact $h'$ until the machine is to be stopped, when it is shifted back to contact $h$. The contacts $h$ $h'$ are arranged in such relation to each other that the switch makes contact with one before it breaks contact with the other, and vice versa, thus keeping the circuit through the machine at all times closed.

In Fig. 2 I show another arrangement, in which the field-of-force magnets serve as the resistance. Here two separate hand-switches, J J', are employed. Switch J is on contact $h$ and switch J' is off of contact $h'$ when the machine is started up; but when the requisite speed has been attained by the machine the switch J' is placed on contact h', and afterward switch J is moved from contact h.

Instead of hand-switches, an automatic switching device operated by the dynamo-electric machine may be employed—such, for instance, as shown in Fig. 3. In this arrangement the spring-contacts l l' correspond respectively to the contacts h h' in Fig. 1; and a rod, M, adapted to be shifted by the movements of a governor, N, geared to the machine as shown, corresponds to the switch G in said Fig. 1. When the dynamo-electric machine is at rest the spring-contact l is in connection with the upper end of the rod M, and the circuit is completed through the machine with the secondary battery cut out; but when the machine reaches a certain predetermined speed the rod M is made to descend under the influence of the governor and make connection with the lower spring-contact l', at the same time gradually breaking connection with the upper spring-contact l. As soon as connection is made with the lower spring-contact, l', the secondary battery is charged.

Another automatic switching arrangement is shown in Fig. 4, where O represents a switch-arm operated by a governor, which is geared to the dynamo-electric machine; P, a segment having contact-plates p p'; Q, a variable resistance in a shunt or auxiliary circuit, and D the secondary battery to be charged. When the machine is at rest the switch rests in contact with the plate p, thus closing the circuit through the shunt-circuit and cutting out the secondary battery; but as the machine speeds up the governor causes the switch-arm to pass from contact-plate p to contact-plate p', thus completing the circuit through the secondary battery.

Fig. 5 shows an arrangement in which the current developed by the machine is made to automatically put into the circuit the secondary batteries to be charged. In said figure, R represents an armature-switch adapted to engage with one or the other of contacts r r' to complete the circuit, either through the shunt-circuit or through the secondary battery D, as the case may be. The armature-switch is acted upon on one side by an electro-magnet, S, interposed in the machine-circuit, and on the other by another electro-magnet, S', in a local circuit containing a variable resistance, T, and a battery, as shown. When the machine is at rest, the armature is attracted by the electro-magnet S', thus closing the circuit through the contact r'. When, however, the machine is started and the current developed by it causes the electro-magnet S to overcome the force of magnet S', the armature shifts and puts the secondary battery D in circuit. By varying the resistance of the local circuit the resisting-power of the electro-magnet S' can of course be regulated.

As a substitute for the electro-magnet S', a spring, weight, or other like contrivance might be employed.

A resistance, T', is also preferably interposed in the main circuit, for the further regulation of the movements of the armature-switch.

I claim as my invention—

1. The combination of a dynamo-electric machine, a developing-circuit, on which the machine is worked temporarily, a main charging-circuit including one or more secondary batteries, and means, substantially as described, for dividing the current through the developing-circuit and the main charging-circuit, and then breaking the developing-circuit while the main charging-circuit remains closed.

2. The combination, substantially as described, of a dynamo-electric machine, a developing-circuit, a main charging-circuit including one or more secondary batteries, and automatic switching devices, substantially as described, normally completing the developing-circuit, and operating, when the machine is in motion, to make connection with the main charging-circuit without breaking the developing-circuit, and then to break the developing-circuit and keep the main charging-circuit closed, and when the machine slackens and stops to perform the said operations in reverse order, whereby the wasting of the charge of the secondary batteries is prevented when the machine is at rest.

3. The combination, substantially as described, of a dynamo-electric machine, a developing-circuit containing an adjustable resistance, a main charging-circuit including one or more secondary batteries, and switching devices, substantially as described, for dividing the current through the developing-circuit and the main charging-circuit, and then breaking the developing-circuit while the main charging-circuit remains closed, all as set forth.

CHARLES E. BUELL.

Witnesses:
  FRED. F. CHURCH,
  WM. T. S. CURTIS.